United States Patent [19]

Higby et al.

[11] Patent Number: 5,650,365
[45] Date of Patent: *Jul. 22, 1997

[54] NEUTRAL LOW TRANSMITTANCE GLASS

[75] Inventors: Paige L. Higby, Maumee; Kevin V. Goodwin, Toledo, both of Ohio

[73] Assignee: Libbey-Owens-Ford Co., Toledo, Ohio

[*] Notice: The term of this patent shall not extend beyond the expiration date of Pat. No. 5,308,805.

[21] Appl. No.: 704,313

[22] Filed: Sep. 17, 1996

[51] Int. Cl.[6] ............................................. C03C 3/087
[52] U.S. Cl. ............................................. 501/71; 501/70
[58] Field of Search ............................................. 501/70, 71

[56] References Cited

U.S. PATENT DOCUMENTS

| Re. 25,312 | 1/1963 | Duncan et al. | 501/71 |
|---|---|---|---|
| 3,723,142 | 3/1973 | Kato et al. | |
| 4,104,076 | 8/1978 | Pons | 501/71 |
| 5,023,210 | 6/1991 | Krumweide et al. | 501/71 |
| 5,278,108 | 1/1994 | Cheng et al. | |
| 5,308,805 | 5/1994 | Baker et al. | |
| 5,346,867 | 9/1994 | Jones et al. | 501/70 |
| 5,352,640 | 10/1994 | Combes et al. | 501/71 |
| 5,393,593 | 2/1995 | Gulotta et al. | |
| 5,411,922 | 5/1995 | Jones | 501/71 |
| 5,521,128 | 5/1996 | Jones et al. | 501/71 |
| 5,545,596 | 8/1996 | Alvarez-Casariego et al. | 501/71 |

FOREIGN PATENT DOCUMENTS

| 349909 | 1/1990 | European Pat. Off. . |
|---|---|---|
| 482535 | 4/1992 | European Pat. Off. . |
| 0705800A1 | 4/1996 | European Pat. Off. . |

*Primary Examiner*—Mark L. Bell
*Assistant Examiner*—David Sample
*Attorney, Agent, or Firm*—Marshall & Melhorn

[57] ABSTRACT

A neutral, generally green-gray low transmittance (no more than 50 percent luminous transmittance) soda-lime-silica glass has reduced solar energy transmittance and reduced ultra violet radiation transmittance when provided with the following colorant constituents in percent by weight:

| | |
|---|---|
| $Fe_2O_3$ (total iron) | 1.3–2 |
| NiO | 0.01–0.05 |
| CoO | 0.02–0.04 |
| Se | 0.0002–0.003 |
| $TiO_2$ | 0.09–3 |

The glass has a ferrous value in the range of 18 to 30.

20 Claims, No Drawings

NEUTRAL LOW TRANSMITTANCE GLASS

FIELD OF THE INVENTION

This application is claiming the benefit, under 35 USC § 119(e), of the provisional application filed Sep. 21, 1995, under 35 USC § 111(b), which was granted a Ser. No. of 60/004,093. The provisional application, 60/004,093, is hereby incorporated by reference.

The present invention relates to a dark, neutral colored glass that has low visible light transmittance, particularly low ultraviolet radiation transmittance, and low total solar energy transmittance. Although not limited to a particular use, the glass exhibits a combination of properties that makes it highly desirable for use in privacy glazings such as in the rear portions of vehicles such as vans. These properties include low visible light transmittance to reduce visibility of the contents of the vehicle, low infrared and total solar energy transmittance to reduce heat gain in the interior of the enclosure, low ultraviolet radiation transmittance to protect fabrics and other interior components from degradation, preferably a neutral green-gray color for the sake of coordinating with a wide range of interior and exterior finish colors, and a composition compatible with flat glass manufacturing methods, e.g., conventional commercial float glass processes.

BACKGROUND OF THE INVENTION

Glasses with good infrared absorption are usually produced by reducing iron present in the glass to the ferrous state or by adding copper. Such materials give glasses a blue color. The materials added to achieve good ultraviolet radiation absorption are $Fe^{3+}$, Ce, Ti or V. The quantities added to cause the desired level of ultraviolet absorption are such as to tend to color the glass yellow. The combination in the same glass of both good UV and good IR absorption gives glasses whose color is either green or blue. Proposals have been made to produce vehicle glazings with good protection against IR and UV radiation in gray or bronze, but the proposed glasses tend to have a greenish yellow tinge.

Prior art heat absorbing glasses which are neutral and of a blue, green, gray or bronze tint tend to have considerably higher solar light transmittances than would be desirable in privacy glazings. For example, Reissue U.S. Pat. No. 25,312 is directed to a gray glass composition containing 0.2 to 1 percent $Fe_2O_3$, 0.003 to 0.05 percent NiO, 0.003 to 0.02 percent CoO and 0.003 to 0.02 percent Se and having a visible transmittance of between 35 and 45 percent at an 0.25 inch thickness.

A typical dark gray prior art glass has the following composition: 72.9% $SiO_2$, 13.7% $Na_2O$, 0.03% $K_2O$, 8.95% CaO, 3.9% MgO, 0.10% $Al_2O_3$, 0.27% $SO_3$, 0.06% $Fe_2O_3$, 0.015% CoO and 0.095% NiO. Solar energy absorption of this type of glass is not as low as would be desired for the purposes of the present invention.

More recently nickel-free heat absorbing gray glasses have been proposed for use in low transmittance glazings. Examples of these glasses may be found in U.S. Pat. Nos. 4,104,076 and 5,023,210. However, both of these patents include chromic oxide as a coloring agent, may require the use of melting operations/apparatus other than conventional overhead fired tank-type melting furnaces to provide the reducing conditions during melting necessary to produce the desired glasses, and have colorant concentrations of iron oxide, cobalt oxide and selenium that would not produce the particular combination of properties desired here.

SUMMARY OF THE INVENTION

We have identified a requirement for excellent neutral privacy glasses such that, in the CIELAB system, they have a color coordinate range: a* of −5±5, preferably −4±3, most desirably −4; b* of 10±20, preferably 0±10, most desirably +4±1; and L* of 50±10, preferably 50±5, most desirably 48±2, at visible light transmittances of no more than 50%. More particularly, at a nominal reference thickness of 4 mm the glass of the present invention exhibits a visible light transmittance (C.I.E. Illuminant A) of no more than 50%, preferably no more than 25%, and most desirably no more than 20%; a total solar energy transmittance of at least 15 percentage points below the visible light transmittance when the visible light transmittance is within the range of 40 to 50 percent, and a total solar energy transmittance of below 25 percent when the visible light transmittance is below 40 percent, and in any case no more than the visible light transmittance; and an ultraviolet radiation transmittance of no more than 25%, preferably no more than 18%, and most preferably no more than 15%[1] These neutral, generally green-gray glasses, having a shading coefficient of no more than 0.53 and preferably no more than 0.46, are produced with a standard soda-lime-silica float glass base composition to which is added iron oxide, cobalt oxide, nickel oxide, titanium dioxide and selenium in certain critical proportions.

[1] Radiation transmittance values disclosed herein are based upon the following wavelength ranges:

| | |
|---|---|
| Ultraviolet | 300–400 nanometers |
| Visible | 380–780 nanometers |
| Total Solar | 300–2130 nanometers |

As is common in the glass industry, the total iron contained in a glass composition or batch will be referred to herein as the "total iron expressed as $Fe_2O_3$". When a glass batch is melted, however, some of this amount of total iron is reduced to FeO, while the rest remains $Fe_2O_3$. The balance between ferrous and ferric oxides in the melt is a result of the oxidation-reduction equilibrium.

Reduction of $Fe_2O_3$ produces not only FeO, but oxygen gas as well, thus decreasing the combined weight of the two iron compounds in the resultant glass product. Consequently, the combined weight of the actual FeO and $Fe_2O_3$ contained in a resulting glass composition will be less than the batch weight of the total iron expressed as $Fe_2O_3$. For this reason, it shall be understood that "total iron" or "total iron expressed as $Fe_2O_3$", as used herein, means the total weight of iron contained in the glass batch before reduction. It should further be understood that "ferrous value", as used herein, is defined as the weight percent ferrous oxide in the resultant glass divided by the weight percent of total iron expressed as $Fe_2$)$_3$.

Unless otherwise noted, the term "percent (%)" and "parts", as used herein and in the appended claims, means percent (%) and parts by weight. Wavelength dispersive X-ray fluorescence was used to determine the weight percents of NiO, $Co_3O_4$, $TiO_2$ and Se and total iron expressed as $Fe_2O_3$. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10}\frac{T_o}{T}$$

($T_o$ = 100 minus estimated loss from reflection = 92; $T$ = transmission at 1060 nm).

The optical density was then used to calculate the percent reduction:

$$\text{percent reduction} = \frac{(110) \times (\text{optical density})}{(\text{Glass thickness in mm}) \times (\text{wt \% total Fe}_2\text{O}_3)}$$

Dark neutral colored glass in accordance with the invention can be produced using iron, cobalt, nickel, titanium and selenium as the colorants in the following ranges:

|  | Weight Percent of Total Glass | |
|---|---|---|
| Component | Range | Preferred Range |
| $Fe_2O_3$ (total iron) | 1.2–2 | 1.3–1.6 |
| NiO | 0.01–0.05 | 0.0225–0.0285 |
| $Co_3O_4$ | 0.02–0.04 | 0.020–0.026 |
| $TiO_2$ | 0.09–3 | 0.4–1 |
| Se | 0.0002–0.0050 | 0.0010–0.0020 |
| Ferrous Value | 18–30% | 19–24% |

Neutral coloration of a green-gray glass is marked by low excitation purity. The glasses of the invention have an excitation purity less than 15%, and preferably less than 10%. The glasses of the invention yield a relatively narrow range of dominant wavelengths ranging from 490 to 580 nanometers, and preferably from 545 to 570.

DETAILED DESCRIPTION

Soda-lime-silica glass may be essentially characterized by the following composition on a weight percentage basis of the total glass:

| | |
|---|---|
| $SiO_2$ | 68–75% |
| $Na_2O$ | 10–18 |
| CaO | 5–15 |
| MgO | 0–5 |
| $Al_2O_3$ | 0–5 |
| $K_2O$ | 0–5 |
| BaO | 0–5 |

Other minor ingredients, including melting and refining aids such as $SO_3$, may also appear in the glass composition. Small amounts of $B_2O_3$ have also sometimes been included in flat glass and may be considered optional. To this base glass are added the coloring constituents of the present invention set forth above.

In accordance with the present invention, Ilmenite is suitable for use as an ingredient in the glass composition. Ilmenite is optionally used as a titanium source and for supplying at least a partial amount of the $Fe_2O_3$.

The glasses of the invention are essentially free of colorants other than those specifically recited, with the exception of any trace amounts of such colorants that may be present as impurities. These glasses may be melted and refined continuously in a conventional tank type melting furnace and formed into flat glass sheets of varying thicknesses by the float method in which the molten glass is supported on a pool of molten metal, usually tin, as it assumes a ribbon shape and is cooled.

Examples 1 through 6 are all satisfactory embodiments of the invention that exhibit a pleasing neutral green-gray appearance and provide excellent reduction of solar energy transmittance and a very desirable shading coefficient. Shading Coefficient is calculated from Lawrence Berkely Laboratories' Window 3.1 software program which is based on an outdoor temperature of 89° F. (32° C.), an indoor temperature of 75° F. (24° C.), a solar intensity of 248 Btu/(hr×sq ft), (789 W/sq m), and a 7.5 mph (12 kph) wind. Thus, luminous transmittance ("Ill A") is less than 20% for all of these examples at a reference thickness of 4 mm. The total solar energy transmittance ("TS") of each example is less than 18% and in all cases is less than the luminous transmittance. The ultraviolet radiation transmittance is exceptionally low in each of the examples, with none exceeding 16.5 percent. The shading coefficient of each example is in all instances not greater than 0.47.

TABLE I

| | Ex. 1 | Ex. 2 | Ex. 3 | Ex. 4 | Ex. 5 | Ex. 6 |
|---|---|---|---|---|---|---|
| Total $Fe_2O_3$ | 1.21 | 1.35 | 1.357 | 1.2 | 1.4 | 1.394 |
| % Ferrous | 19.7 | 19.7 | 23.4 | 25 | 20 | 20.8 |
| $Co_3O_4$ (ppm) | 310 | 206 | 220 | 138 | 230 | 221 |
| % $TiO_2$ | 2.47 | 0.42 | 0.217 | .5 | 1.0 | 0.09 |
| NiO (ppm) | 295 | 264 | 266 | 146 | 259 | 268 |
| Se (ppm) | 48 | 21 | 15 | 15 | 19 | 15 |
| Ill A | 12.7 | 18.4 | 18.9 | 26 | 16.2 | 19.6 |
| TS | 16 | 17.1 | 15.4 | 17 | 10.9 | 17.2 |
| UV | 3.1 | 9.4 | 12.7 | 16.5 | 10.1 | 13 |
| L* | 42.3 | 49.8 | 50.9 | 58.5 | 48.2 | 50.8 |
| a* | −5.8 | −3.39 | −4.36 | −5.1 | −7.7 | −3.8 |
| b* | 9.1 | 6.81 | 1.49 | 0.84 | −3.6 | 1.5 |
| Dom. Wave | 566 | 569 | 514 | 502 | 488.9 | 519.4 |
| % Purity | 15 | 10.3 | 1.9 | 2.6 | 11 | 1.9 |

Glass made by the float process typically ranges in thickness from about 2 to 10 millimeters. For the preferred solar radiation control features of the present invention, it is preferred that the transmittance properties described herein be obtained within the thickness range of 3 to 5 millimeters.

What is claimed is:

1. A neutral colored soda-lime-silica glass composition comprising on a weight percent basis: 68–75% $SiO_2$, 10–18% $Na_2O$, 5–15% CaO, 0–5% MgO, 0–5% $Al_2O_3$, 0–5% $K_2O$, and 0–5% BaO and colorants consisting essentially of from 1.2 to 2 weight percent $Fe_2O_3$ (total iron), from about 0.01 to 0.05 weight percent NiO, from 0.02 to 0.04 weight percent $Co_3O_4$, from about 0.09 to 3 weight percent $TiO_2$, and from 0.0002 to 0.005 weight percent Se, and having a ferrous value in the range of 18 to 30 percent.

2. A glass as defined in claim 1, wherein said glass, at a nominal 4 millimeter thickness, has a total solar energy transmittance of at least 15 percentage points below the visible light transmittance (Illuminant A) when the visible light transmittance is within the range of 40 to 50 percent, and a total solar energy transmittance of below 25 percent when said visible light transmittance is below 40 percent.

3. A glass as defined in claim 1, having a color defined by the following CIELAB coordinates: a*=−5±5; b*=10±20; L*=50±10.

4. A glass as defined in claim 1, having a color defined by the following CIELAB coordinates: a*=−4±3; b*=+0±10; L*=50±5.

5. A glass as defined in claim 1, having a dominant wavelength in the range of 490 to 580 and an excitation purity of less than 15.

6. A glass as defined in claim 1, having a dominant wavelength in the range of 545 to 570 and an excitation purity of less than 10.

7. A glass as defined in claim 1, wherein said glass has a shading co-efficient no more than 0.53.

8. A glass as defined in claim 1, wherein said glass has an ultraviolet radiant transmittance of no more than 25 percent.

9. A glass as defined in claim 1, wherein said glass has a shading co-efficient no more than 0.46.

10. A neutral colored soda-lime-silica glass composition comprising on a weight percent basis: 68–75% $SiO_2$, 10–18% $Na_2O$, 5–15% CaO, 0–5% MgO, 0–5% $Al_2O_3$, 0–5% $K_2O$, and 0–5% BaO and colorants consisting essentially of from 1.2 to 2 weight percent $Fe_2O_3$ (total iron), from about 0.01 to 0.05 weight percent NiO, from 0.02 to 0.04 weight percent $Co_3O_4$, from about 0.09 to 3 weight percent $TiO_2$, and from 0.0002 to 0.005 weight percent Se, and having a ferrous value in the range of 18 to 30 percent; the glass, at a nominal 4 millimeter thickness, having a total solar energy transmittance of at least 15 percentage points below the visible light transmittance (Illuminant A) when the visible light transmittance is within the range of 40 to 50 percent, and a total solar energy transmittance of below 25 percent when said visible light transmittance is below 40 percent.

11. A glass as defined in claim 10, wherein said weight percent $Fe_2O_3$ (total iron) is in the range of 1.3 to 1.6 percent.

12. A glass as defined in claim 10, wherein said NiO is present in the range of 0.0225 to 0.0285 weight percent.

13. A glass as defined in claim 10, wherein said $Co_3O_4$ is present in the range of 0.020 to 0.026 weight percent.

14. A glass as defined in claim 10, wherein said Se is present in the range of 0.0010 to 0.0020 weight percent.

15. A glass defined in claim 10, wherein said $TiO_2$ is present in the range of 0.4 to 1 weight percent.

16. A glass as defined in claim 10, having a ferrous value in the range of from about 19 to about 24 percent.

17. A glass as defined in claim 10, having a color defined by the following CIELAB coordinates: $a^*=-4\pm3$; $b^*=0\pm10$; $L^*=50\pm5$.

18. A glass as defined in claim 10, having a shading coefficient of no more than 0.46.

19. A glass as defined in claim 10, having an ultraviolet radiation transmittance of no more than 18 percent.

20. A neutral colored soda-lime-silica glass composition comprising on a weight percent basis: 68–75% $SiO_2$, 10–18% $Na_2O$, 5–15% CaO, 0–5% MgO, 0–5% $Al_2O_3$, 0–5% $K_2O$, and 0–5% BaO and colorants consisting essentially of from about 1.3 to 1.6 weight percent $Fe_2O_3$ (total iron), from about 0.0225 to 0.0285 weight percent NiO, from about 0.020 to 0.026 weight percent $Co_3O_4$, from about 0.4 to 1 weight percent $TiO_2$, and from 0.0010 to 0.0020 weight percent Se, and having a ferrous value in the range of 18 to 30 percent; the glass having a visible light transmittance of no more than 25 percent, a total solar energy transmittance of no more than 25 percent and an ultraviolet radiation transmittance of no more than 15 percent at a nominal thickness of 4 millimeters.

* * * * *